M. Witmer.
Churn.
No. 87,743.        Patented Mar. 9, 1869.
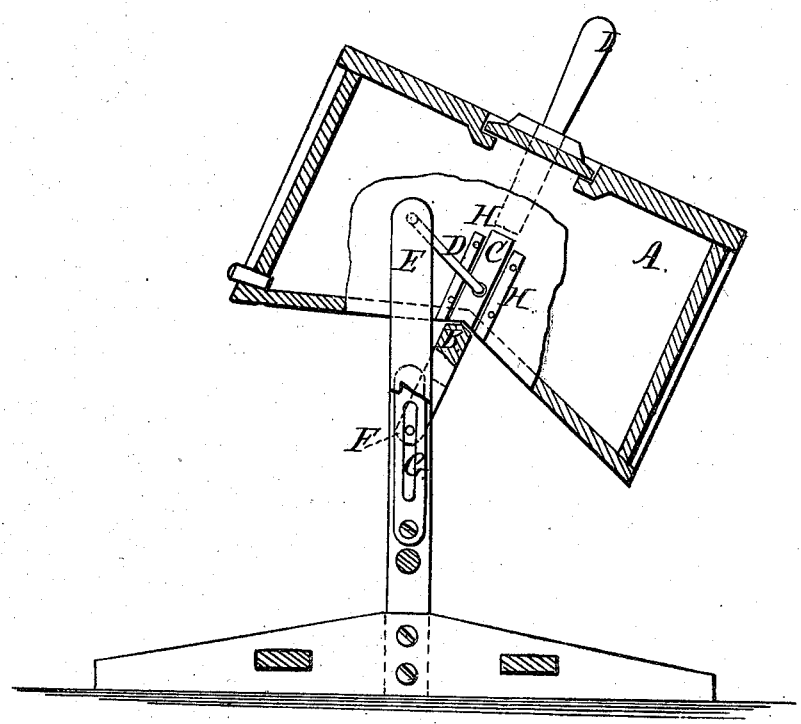
Witnesses:
Chas Nida
Wm A Morgan
Inventor:
Manuel Witmer
per Munn & Co
Attorneys.

MANUEL WITMER, OF CEDAR RAPIDS, IOWA.

Letters Patent No. 87,743, dated March 9, 1869.

IMPROVEMENT IN CHURNS.

The Schedule referred to in these Letters Patent and making part of the same.

*To all whom it may concern:*

Be it known that I, MANUEL WITMER, of Cedar Rapids, in the county of Linn, and State of Iowa, have invented a new and useful Improvement in Churns; and I do hereby declare that the following is a full, clear, and exact description thereof, which will enable others skilled in the art to make and use the same, reference being had to the accompanying drawings forming part of this specification.

This invention relates to improvements in churns, whereby it is designed to provide an improved arrangement of vibrating and swinging churns, as will be more fully described on reference to the accompanying drawing, wherein a sectional elevation of a churn constructed according to my improvement is represented.

A represents the vessel for holding the cream, of rectangular form on all sides, except the bottom, which is an obtuse angle, the vertex of which is at the centre, in the direction of the greatest length of the vessel, and projecting inwardly, and serving the double purpose of facilitating the balancing of the vessel on its support B, and more thoroughly agitating the cream as the vessel is vibrated in the process of churning.

The support B is suspended between two arms C, suspended by the links D from the top of the framing E, and projecting downward below the said support B.

The said projecting ends are provided with stud-pins F, taking into vertical slots G, in the framing E.

The sides of the vessel are provided with dovetail grooves, either made in the surface of the wood, or other substance, of which the vessel is composed, or by cleats H, fastened upon the sides, and the upper ends of the arms C are fitted to slide into these grooves when the vessel is placed on its support B, and maintain it thereon, in a manner to be readily detached.

I represents handles for operating the vessel A.

This arrangement provides an easy method of swinging the vessel at the same time that it is vibrated, giving a more intense agitation to the cream than can be obtained from either motion alone, and the agitation is further intensified by the form of the bottom of the churn, as will be readily understood.

Having thus described my invention,

I claim as new, and desire to secure by Letters Patent—

The combination of the vessel A with its support B, arms C, links D, and framing E, all substantially as and for the purpose specified.

MANUEL WITMER.

Witnesses:
JOHN KRAUT,
AQUILLAR MILLER.